United States Patent Office 3,170,880
Patented Feb. 23, 1965

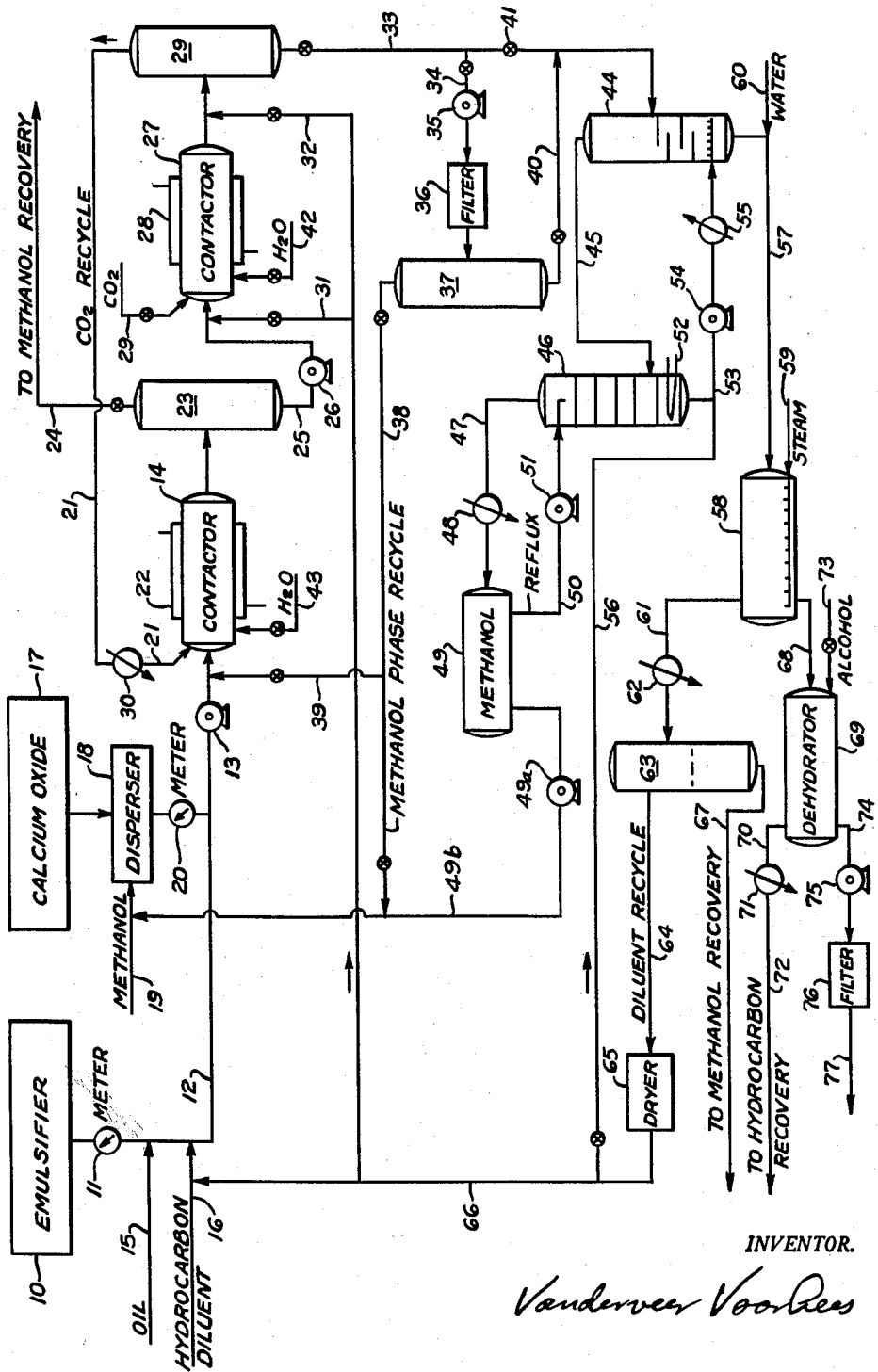

3,170,880
DISPERSIONS OF CALCIUM COMPOUNDS
IN OILS
Vanderveer Voorhees, Los Altos, Calif., assignor to Bray
Oil Company, Los Angeles, Calif., a limited partnership of California
Filed Nov. 17, 1959, Ser. No. 853,631
13 Claims. (Cl. 252—327)

This invention relates to colloidal dispersions of calcium compounds in oils and to the process of making them. More particularly it relates to dispersions of water insoluble calcium compounds in lubricating oils for the purpose of improving their lubricating characteristics, stability, corrosion resistance, etc. Still more particularly the invention relates to dispersions in which the particle size is in the sub-microscopic range, that is in the range where the colloidal particles are invisible in ordinary light.

The invention is illustrated by a drawing which shows diagrammatically, apparatus suitable for carrying out the process.

In the manufacture of lubricating oils it has heretofore been found desirable to add to the oil, usually of mineral origin, various substances to improve the characteristics of the oil such as anti-oxidants or oxidation stabilizers, detergents or sludge dispersers, and neutralizing compounds to offset the corrosive effects of acids encountered by the oil during use, for example, in the crankcase of an internal combustion engine. Neutralizing agents for this purpose have been oil soluble amines and highly dispersed inorganic bases. Those employed in the manufacture of detergent oils are chiefly the sulfonates, particularly the alkaline earth metal sulfonates. It has commonly been the practice to employ an excess of the alkali in manufacturing the sulfonate so that the finished oil has a titratable alkali value. Such oils are described for example, in the patent of Campbell et al. 2,485,861. The amount of excess alkali, for example, calcium hydroxide, which can be introduced in this way is usually quite limited. It is difficult to exceed an alkali value of 20 mg. KOH per gram with an oil concentrate containing about 30% to 40% of calcium mahogany sulfonate. Higher alkali concentrations up to about 40 or 50 alkali value can be obtained with barium hydroxide. If carbon dioxide is introduced into the hot mixture of sulfonate, oil, water and alkaline earth metal base during the reaction, larger amounts of the base can be absorbed by the oil as shown in U.S. Patent No. 2,839,470.

One of the difficulties frequently encountered in the prior art processes of making super-based oils has been the problem of obtaining a clear product which is free of cloudy material. It has generally been necessary to use an excess of a finely divided base and remove it by filtration, often a difficult operation owing to the colloidal nature of the base, particularly in the case of calcium hydroxide which is available in the form of hydrated lime. A common test for clarity of the product is to prepare a 5% solution of the oil in hexane or light petroleum naphtha and observe the extent of the cloud present, if any. If the oil contains visible colloidal material, it may give serious trouble in engines and other equipment lubricated by it as a result of abrasion, sedimentation and stoppage of passages in the machinery and plugging of oil filters commonly used in automobile engines, trucks and tractors.

It is an object of my invention to produce a dispersion of water insoluble calcium compounds, particularly calcium carbonate, in oils in which the dispersed particles are below the optical size range so that the dispersion is bright and clear. It is also an object of my invention to produce superbased oils containing dispersed calcium carbonate in concentrations far greater than those produced heretofore. Another object of my invention is to produce super-based oils by a process in which the clarification problem is largely eliminated so that filtration of the product may be entirely omitted or may be reduced to a simple "polishing" operation. A further object of my invention is to provide a method by which the size of dispersed particles of calcium compounds in oils can be controlled so that desired colloidal dispersions can be produced within the range of microscopic and sub-microscopic size. Other objects of the invention will appear from the following description thereof.

I have discovered that dispersions of calcium compounds in oils can be prepared by reacting a mixture of calcium oxide with carbon dioxide or other anhydrous acid in the presence of an oil, an anionic emulsifying agent and anhydrous methanol, under conditions to maintain an emulsion of oil and methanol. The chemistry involved in the process is not completely understood but it appears that the calcium oxide forms a complex with the methanol and the emulsifier which reacts with the acid. Considerable heat is evolved in the reaction, temperatures rising as much as 50° F. It is usually desirable to employ a hydrocarbon solvent in the reaction to reduce viscosity and maintain thorough mixing. Solvents suitable for this purpose are petroleum naphthas, aromatic solvents—particularly benzene, toluene and xylene, etc. I prefer to use a petroleum naphtha boiling at about 250° F. to facilitate separation from methanol which boils much lower. After the reaction is complete, usually within 30 minutes to 2 hours depending on the efficiency of contacting, the reaction products are heated to distill off the methanol and the hydrocarbon solvent. It is convenient to remove methanol from the reaction mixture by introducing vapors of boiling solvent, preferably the same hydrocarbon solvent just referred to, the methanol fraction being condensed and used repeatedly in the process. After this stage of the process, it is generally desirable to introduce water for the purpose of hydrating the calcium compounds and preventing the formation of a solid or semi-solid gel which often forms in high concentrations of calcium salt dispersions, although under some conditions this hydration step can be omitted depending on the nature of the oil, concentration of dispersion and the emulsifier employed. Water can be introduced either in the form of liquid water or steam, preferably the former, and I have found that the rate of contact with water can be increased by adding a higher alcohol, for example butyl or amyl alcohol. An excellent contacting agent for the hydration step is aqueous secondary butyl alcohol containing about 28% of water. During the hydration step, methanol vapors are evolved and may cause troublesome foaming unless care is taken.

After hydration, heating is continued to remove the remaining hydrocarbon solvent, water and butyl alcohol if employed. Where steam is employed for hydration, the hydrocarbon solvent may be completely stripped out of the oil with the steam while raising the temperature to about 300° to 350° F. The oil is then ready for final filtration preferably with the aid of one of the well-known filter aid materials such as silica gel, alumina and diatomaceous earth. Commercially available products known as Super-Cel and Hy-Flo of the Johns Manville Co. are satisfactory.

Various oil soluble emulsifying agents or surface active agents can be used in my process. More importantly in this class are the preferentially oil soluble sulfonates known as mahogany sulfonates and the oil soluble phosphonates. The sulfonates are readily prepared by methods well known in the art, for example, by the sulfonation of lubricating oil fractions with $SO_3$ or oleum from which the sulfonic acids are converted to the corresponding calcium compounds, either directly or through intermediate sodium sulfonates as described for example in U.S. Patent to Bray #2,689,221. Sulfonates of other metals than calcium can be used, particularly the metals of Groups I and II of the Periodic System, aluminum and iron.

Sulfonic acids are also readily prepared by sulfonation of alkylated aromatics such as the alkylated benzenes and naphthalenes having about 15 to 40 carbon atoms. For my purpose the sulfonic acids can be used direcly as produced in the sulfonation process or in the form of their calcium, barium, sodium, ammonium or other salt. When employing salts other than calcium in the superbasing reaction, a substantial amount of the cation will be found to be replaced by calcium. Oil soluble phosphonic acids are conveniently prepared by reacting an unsaturated compound such as an olefine polymer with a phosphorus sulfide, preferably $P_2S_5$, in the manner well known in the art, for example, as described in the patent of Lemon #2,906,709. Where the phosphonic acids are used, they need not be completely purified from other acids obtained as by-products in the process of phosphonation. For example, phosphoric acid may be allowed to remain and will be converted to colloidal calcium phosphates.

It is important that water be excluded from the reaction to avoid hydration of calcium oxide. Methanol of commerce, containing usually less than 0.5% and not more than 1% of water is satisfactory. Where the amount of water in the methanol is excessive, it can readily be removed by distillation. The methanol recovered from the process is quite satisfactory for re-use in the process, having had most all water removed from it by the calcium oxide used in the process.

In some cases it is advantageous to add a small amount of water during the course of the reaction providing it is introduced gradually in the presence of excess $CO_2$ or other acid. I have found that the addition of about 5% to 20% of water preferably about 10% based on the weight of calcium oxide employed in the reaction sometimes increases the rate of absorption of dispersed calcium carbonate in the oil. When water is added to the reaction it is advisable to introduce it in the form of a methanol solution in order to obtain uniform distribution in the reaction mixture, inasmuch as any local concentration of water in the reaction mixture can result in the formation of hydrated lime which is not only ineffective in producing the desired dispersion of calcium compound but may seriously interfere with clarification of the product by filtration.

Dispersions of calcium compounds in oil must contain particles of less than 1 micron in diameter and preferably less than 0.1 micron diameter in order to meet the usual requirements for clarity. When the particles fall within the range of about 1 to 10 microns diameter, for example 1 to 5 microns diameter, the dispersion has a cloudy appearance although such dispersions may pass through the ordinary filtering processes used in the petroleum industry. For example, such a dispersion containing 1 to 3 microns diameter particles can be rapidly filtered through a bed of "Hy-Flo" diatomaceous earth and the filtrate will be milky or opalescent. Clarification of such an oil by admixing with extremely fine filter aid materials such as "Super-Cel" diatomaceous earth is impossible, owing to the extremely fine nature of the dispersion.

If the process of dispersing the calcium compound in the oil results in the formation of particles or clusters of particles having diameters ranging from 1 to 50 microns, it becomes practically impossible to filter the oil, owing to a silting action of the particles on the surface of the filter. This silting action appears to result in a graded packing of fine particles having diameters down to 1 micron or less, between coarser particles which serve to support the fine particles in the surface layer, resulting in a substantially complete sealing of the surface against passage of liquid. Accordingly an important feature of my process is that it produces colloidal dispersions of calcium compounds which are relatively free of particles or agglomerates coarser than about 5 microns and usually the dispersions made by my process are made up of colloidal particles of calcium compounds of less than 0.1 micron diameter.

The following examples will serve to illustrate the method which I employ in making my calcium dispersions.

*Example 1*

7.5 kg. of a polybutene oil having a molecular weight of about 800–1000 prepared by the catalytic polymerization of liquid butylene, was treated in an aluminum kettle with 1500 grams of phosphorous pentasulfide and 150 grams of sulfur. Air was excluded from the reaction by providing a blanket of $CO_2$. The mixture was rapidly agitated while heating to a temperature of 400° to 450° F. After two hours, the reaction mixture was diluted with 6 kg. of neutral oil of 90 viscosity SSU at 100° F. The mixture was allowed to settle, then decanted from the unreacted $P_2S_5$, and hydrolyzed with steam for 2 hours at a temperature of 360° to 390° F. It was then mixed with 7.5 kg. of water and 3 kg. aqueous secondary butyl alcohol to extract phosphoric acids produced in the hydrolysis. The water layer which formed in the extraction was discarded. To 423 grams of wet oil containing alcohol and water was added 40 grams of lime to neutralize the acids present. The oil was then dehydrated by heating to 400° F. and filtered rapidly while hot. It had an alkali value of 40. To 283 grams of the resulting clear brownish-red oil was added 8 grams of calcium oxide prepared by igniting hydrated lime in a muffle furnace at about 1500° F. 250 cc. of methanol and 50 cc. of naphtha boiling at about 250° F. was added to the oil, then carbon dioxide was introduced into the emulsion with rapid stirring. After 2 hours of carbonation the thick cream was transferred to a pan and heated to drive off the methanol and solvent. The product was a thick mush rather than an oil. It was mixed with 200 cc. of naphtha solvent and then 100 cc. of aqueous butyl alcohol was added to hydrate the calcium compounds in the mixture and reverse the emulsion which appears to be an oil-in-water type. On dehydration of the resulting mixture to 330° F., an oil was obtained which filtered rapidly through a bed of diatomaceous earth. The product was a clear red-brown oil having an alkali value of 57.

*Example 2*

A lubricating oil of about 400 viscosity SSU at 100° F. containing about 40% of calcium sulfonate was prepared by sulfonation with oleum, neutralization with sodium hydroxide, concentration of the sodium sulfate with butyl alcohol and conversion of the sodium to calcium with calcium chloride followed by dehydration at 300° F. in the presence of lime and filtration. It had an alkali value of about 18 mg. KOH per gram and a sulfated ash of 7.6%. To 300 grams of this oil was added 20 grams of calcium oxide in suspension in 200 cc. methanol. 100 cc. of naphtha—250° B.P.—was added to reduce viscosity and the mixture was rapidly agitated while a stream of $CO_2$ was introduced at a temperature of about 120° F. for 1½ hours. The methanol was then distilled from the mixture up to a temperature of 180° F. 50 cc. of aqueous secondary butyl alcohol was then added to the mixture to provide water for hydration of the calcium compounds. The product was dehydrated by heating to 340° F. and filtered at a rapid rate. The red oil obtained was clear and quite fluid at room temperature. It had an alkali value of 65 and sulfated ash 13.36%.

*Example 3*

The same stock as that employed in Example 2 was used in this experiment without naphtha dilution. To 215 grams of calcium sulfonate-oil solution was added 20 grams of calcium oxide (freshly ignited hydrated lime) suspended in 200 cc. methanol. The mixture was rapidly agitated with a motor driven stir and heated to approximately the boiling point of methanol. $CO_2$ was passed in for about 1 hour then 100 cc. of naphtha boiling at 250° F. was added and the methanol distilled off to 200° F. 50 cc. of aqueous secondary butyl alcohol was then added to invert the gel structure. The mixture was then dehydrated to 330° F. and filtered at a moderate rate. The product was a clear red liquid flowing easily at room temperature. Alkali value—90, ash—15.8%.

*Example 4*

To 250 grams of calcium sulfonate-oil solution like that used in Example 2 was added a suspension of 40 grams of freshly ignited calcium oxide suspended in 300 cc. methanol. A thick creamy emulsion was formed on rapid agitation. This was heated to 130° F. for 10 minutes. $CO_2$ was passed in for 1½ hours and 200 cc. of naphtha was added to facilitate mixing. The resulting emulsion was filtered through a bed of diatomaceous earth on the suction filter to remove excess CaO. The emulsion filtered rapidly and the filtrate separated into two phases, an oil phase beneath a methanol phase. The methanol was distilled from the filtrate leaving a clear orange yellow oil which was completely dehydrated and remained fluid when cold. The alkali value was 60. The filter cake reacted violently with water showing that it consisted mainly of unchanged excess CaO and the water extract of the cake gave a test for calcium hydroxide. This example shows that excess calcium oxide can be employed in the reaction and can be removed from the emulsion by filtration before further processing the oil. If desired, the methanol phase which separates from the emulsion can be reused in the process without distillation.

*Example 5*

To 220 grams of calcium sulfonate in oil the same as that employed in Example 2, was added 40 grams calcium oxide suspended in 250 cc. methanol and 30 cc. of naphtha was added. After mixing for 10 minutes at 130° F. $CO_2$ was passed in for 10 minutes. Then 4 cc. of water was added in solution in 25 cc. methanol, the water being added dropwise over a period of eight minutes while $CO_2$ was continued. The mixture thickened to the consistency of paint and it was necessary to add more naphtha from time to time to facilitate mixing, 100 cc. total naphtha being added. After 20 minutes further carbonation, it was necessary to add 60 cc. more naphtha to reduce viscosity and after 1 hour further carbonation, 40 cc. more naphtha was added. After carbonating for 1 hour and 35 minutes, the yellow emulsion was filtered at a rapid rate. The filtrate was heated to 300° F. to drive off solvent. After cooling, 50 cc. aqueous butyl alcohol was added and the filtrate dehydrated by heating to 340° F. The clear bright oil was re-filtered using about 2% by weight of Super-Cel for clarification. The filter rate was quite rapid at the start but it became slower as the filtration proceeded, apparently owing to partial sealing of the filter bed by coarse particles. The product was a clear oil, fluid at room temperature with an alkali value of 2 with phenolphthalein indicator showing insufficient carbonation. The alkali value when titrated with methyl orange indicator was 220 and the sulfated ash was 29.51%.

*Example 6*

To 230 grams of calcium mahogany sulfonate similar to that employed in Example 2 was added 40 grams of calcium oxide in suspension in 250 cc. methanol. The mixture was stirred to a smooth cream and $CO_2$ was passed in for 5 minutes. There was then added dropwise 5 cc. of water in 25 cc. methanol. The temperature increased from about 80° to 100° F. from the heat of reaction. After a total carbonation time of 40 minutes, 200 cc. of naphtha was added to thin down the mixture and the emulsion was filtered rapidly on a suction funnel. The filtrate was evaporated to 350° F. to eliminate solvents and re-filtered rapidly with Super-Cel. The product was quite fluid and bright. It was neutral to phenolphthalein and had an alkali value of 97 when titrated with methyl orange.

*Example 7*

A by-product sodium sulfonate obtained from washing acid treated lubricating oil with caustic soda after treating with fuming sulfuric acid, contained about 1% of water and 0.33% sodium sulfate. The active sulfonate content was 19% assuming a molecular weight of 450 for the sulfonate. This product tested basic to phenolphthalein with an alkali value of 3.5. The alkali value determined with methyl orange was 58.5. 200 grams of the solid brown mass was melted and dissolved in 100 cc. of naphtha—250° F. boiling point. 300 cc. methanol was then added followed by 40 grams of calcium oxide. $CO_2$ was passed into the warm mixture with rapid stirring. In 30 minutes a thick dark brown creamy paste resulted which was fluidized by adding 100 cc. more naphtha. 10 grams more calcium oxide was then added and carbonation continued. After 50 minutes 1000 cc. more naphtha was added and again after 1 hour and then after 1½ hours. Carbonation was stopped after 2 hours and the emulsion was filtered rapidly. When heating the filtrate to distill off methanol it coagulated on the heated surface of the vessel. 100 cc. of aqueous butyl alcohol was then added resulting in the separation of a voluminous mush which quickly liquified to an oil. Dehydration of a portion of the oil to 300° F. gave a dark brown semi-solid product. The remainder of the oil was reduced in viscosity by adding half its volume of neutral oil, then filtered. The product was a clear oil, fluid at room temperature and capable of giving a clear solution in a light lubricating oil. The alkali value was 260 and the ash 31.93%. A calcium determination showed that 86.5% of the ash corresponded to calcium sulfate, the remainder being mostly sodium sulfate not converted in the process.

*Example 8*

A lubricating distillate fraction of Arabian crude oil was sulfonated with oleum of 25% $SO_3$ concentration. The resulting sulfonic acid was neutralized with sodium hydroxide, converting it to the sodium sulfonate in solution in unsulfonated oil. The resulting solution was purified by washing with water and butyl alcohol to remove sodium sulfonate and other impurities. It was then converted to the calcium salt by treating with calcium chloride solution and dehydrated at a temperature about 300° F. in the presence of a small amount of lime. The resulting oil was filtered to give a clear red calcium sulfonate solution having a sulfated ash of 8%.

To 200 grams of this oil was added 100 cc. of naphtha boiling at about 250° F. and 300 cc. methanol slurried with 20 grams calcium oxide. The mixture was heated and stirred rapidly at 140° F. while a stream of carbon dioxide was injected. More naphtha was added at intervals to prevent excessive thickening of the mixture until a total of 300 cc. had been added.

After an hour there was added dropwise 4 cc. of water in 25 cc. of methanol and carbonation was continued for 30 minutes after all the water had been added. The resulting emulsion was then filtered with suction and the filtrate was evaporated on a hot plate. It was necessary to stir it to prevent formation of gel on the hot surface. After the methanol phase had been evaporated at 150° F., there was added 50 cc. of secondary butyl alcohol and the clear oil solution was heated to 260° F. The oil became quite viscous. An aqueous solution of butyl alcohol was added to the oil after cooling to 210° F. After adding 45 cc. of aqueous butyl alcohol containing about 30% of water, the oil suddenly became mushy and then reliquified, indicating an inversion of the emulsion by the action of water. The oil was then dehydrated to 340° F. and filtered rapidly through a bed of diatomaceous earth. The clear product was fluid when cold and had an alkali value of 0.2 with phenolphthalein indicator and 220 alkali value with methyl orange indicator. The sulfated ash was 28.83%. When added to a motor oil in the amount of 1.4% and tested on a 2 cycle engine, it was found to improve the cleanliness of the valve ports and reduce spark plug deposits.

*Example 9*

To 100 grams of oleic acid (commercial red oil) was added 100 grams 90 viscosity neutral oil. To this mixture was added 40 grams of calcium oxide in suspension in 200 cc. methanol and 150 cc. naphtha was added while a stream of carbon dioxide was injected for 1 hour at a temperature of about 130 F. The resulting white emulsion was filtered to remove unreacted calcium oxide. A portion of the slimy filtrate was heated in vacuum to remove methanol and naphtha. The product was a viscous honey colored oil having an alkali value of 286.

The remainder of the filtrate was heated with a small amount of water, then dehydrated at 330° F. The hot oil was filtered giving a product quite fluid at ordinary temperature, having an alkali value of 272 and a sulfated ash of 32.5%. This amount of ash is more than 2½ times the amount which would be obtained from calcium oleate in 50% oil solution, showing that a major part of the calcium in the product is in the form of an invisible colloidal dispersion.

*Example 10*

To 5 kg. of the sodium sulfonate described in Example 7 was added 2.5 kg. 100 viscosity pale oil. The mixture was heated in an aluminum kettle until uniformly dissolved. Two gallons of naphtha was added, then was added 1.5 gal. of methanol in which was slurried 1125 grams of calcium oxide, the temperature rising slightly from 130° to 135° F. on mixing. Care was taken to disintegrate all lumps of calcium oxide in the methanol slurry by means of a high speed mixer. A stream of carbon dioxide was passed into the reaction mixture with rapid stirring, the temperature rising from 130° to 140° F. approximately the boiling point of methanol in the mixture. Cold water was applied to the outside of the reaction vessel to remove heat of reaction. After 1 hour the temperature was 138° F. and after 1.25 hours the temperature was 110° F. Excess methanol was evaporated by heating to 210° F. then 250 cc. of water was added gradually, care being taken to avoid foaming over. 300 cc. acqueous butyl alcohol was then added. The mixture was dehydrated by heating to 330° F. and then rapidly filtered with suction, employing 1% of Super-Cel as a filter aid. The clear oil product had an alkali value of 252 and sulfated ash 39.93%. The ash consisted of 84% of calcium sulfate.

*Example 11*

To 7.5 kg. of polybutene having a molecular weight of about 750 there was added 1500 grams of phosphorus pentasulfide. The reaction mixture was blanketed with carbon dioxide to prevent oxidation by the air and the mixture was heated for a period of 4½ hours while the temperature was gradually increased from 300° to 440° F. 7 kg. of 90 viscosity neutral oil was then added and the solution allowed to settle over night. 280 grams of unreacted $P_2S_5$ was recovered by filtration of the residue. The oil was transferred to a glass enamelled kettle and 200 cc. of water was added followed by steaming for 2 hours at 260° F. When cooled to 220° F. 1 gal. of water was added and thoroughly mixed with the oil followed by the addition of 1.5 liters of butyl alcohol. The mixture was settled over night and a lower water layer, approximately 1 gal., containing phosphoric acid, was withdrawn. The oil layer was heated to 290° F. to remove the water and alcohol. The acid value was 30, representing mostly phosphonic and thiophosphonic acids.

800 grams of calcium oxide produced by roasting hydrated lime at 1600 F. was slurried in 1.5 gal. methanol and the slurry added to the oil together with 1 gal. naphtha. A stream of carbon dioxide was injected with rapid agitation. The mixture was carbonated for 4 hours at a temperature of about 120° F. while 80 cc. of water in methanol was added dropwise. The methanol was removed from the mixture by heating to 200° F., continuing the stream of $CO_2$. Steam was then injected to remove naphtha and hydrate the product. A sample was tested and was found to have a low filter rate indicating insufficient hydrolysis. Thereupon, the oil was cooled at 220° F. and water and aqueous butyl alcohol were added. On again dehydrating the oil to 320 F., it was found to filter at a more rapid rate, a yield of 3½ gal. of clear oil being obtained. The alkali value was 60; ash 8.73%; phosphorus 1.3%; sulfur 1.64%.

*Example 12*

To 200 grams of lubricating oil solution of calcium mahogany sulfonate containing about 35% to 40% of sulfonate having an ash value of 8.4% and alkali value of 19.1, there was added 100 cc. of naphtha and 120 cc. methanol containing 28 grams (½ mol) of calcium oxide. These ingredients were thoroughly mixed at 100° F. in a high speed turbine mixer. To the mixture was added dropwise 30 grams of anhydrous oxalic acid (½ mol) dissolved in 100 cc. methanol. After 15 minutes the temperature had risen to 125° F., after 25 minutes, 135° F. Stirring was continued for 35 minutes. 100 cc. more naphtha was added to the creamy yellow emulsion, which was then filtered rapidly on a suction filter leaving a small amount of unreacted calcium oxide. The filtrate was heated to 200° F. to eliminate methanol, leaving a clear oil. 15 cc. of water was added and the mixture was boiled, then 10 cc. of aqueous butyl alcohol was added to complete the hydration. The clear oil was then dehydrated to 330° F. and filtered rapidly while hot. The product solidified when cold. It tested acid with phenolphthalein. The alkali value with methyl orange indicator was 3.0 and the sulfated ash was 22.5%.

*Example 13*

To 200 grams calcium sulfonate-oil solution similar to that employed in Example 12 was added 100 cc. naphtha and 30 grams of calcium oxide dispersed in 100 cc. methanol. There was then added dropwise a solution of 23 grams $P_2O_5$ dissolved in 100 cc. methanol prepared by adding methanol gradually to a mixture of $P_2O_5$ in naphtha. The reaction mixture was rapidly agitated at a temperature of 139° F. during addition of $P_2O_5$ and 100 cc. more naphtha was added to reduce the consistency of the emulsion which thickened during the addition of the acid. Mixing was continued for 1 hour after all the acid was added. More naphtha was added to the emulsion to further reduce the consistency and then it was filtered on a suction funnel. A small amount of the emulsion which had dried on the walls of the mixer had the consistency of a waxy varnish. The filtrate was heated on a hot plate to evaporate methanol, some difficulty being encountered in the temperature range of 160° to 200° F. because of caking and gelatinization. Water and aqueous butyl alcohol were added to the mixture but it was still difficult to heat without gelling until a higher boiling aromatic solvent—xylene—was added. A small amount of lime was also added to insure a basic reaction. The product was a viscous oil. It was diluted with 30 grams of neutral oil, dehydrated at 460° F. and filtered. The clear red oil had an alkali value of 90 (104 corrected for dilution) and sulfated ash 17.72% showing a content of invisible colloidal calcium phosphate of about 10%.

*Example 14*

Calcite crystals weighing 24.45 grams were ignited in a muffle furnace at 1600° F. then ground in a mortar to a coarse powder. A small amount of starch was mixed with the powdered calcite and the mixture reignited for 1 hour. This was repeated with more starch, the purpose of the starch being to provide carbon, which on burning to carbon monoxide, would aid removal of $CO_2$ from the calcite. The resulting white calcium oxide weighed 12.4 grams, slightly less than the theory yield—13.7— owing to some loss in grinding and ignition. To the calcium oxide thus obtained was added 150 cc. methanol and the slurry was added to 150 grams of calcium sulfonate-in-oil-solution (8% ash). 100 cc. of naphtha— 250° F. boiling point—was added and stream of $CO_2$ was passed into the rapidly agitated mixture. The temperature remained at approximately 87° F. Then to the mixture was added slowly 2 cc. of water dissolved in 30 cc. methanol. The temperature increased to 120° F. in 10 minutes and to 130° F. in 40 minutes. The resulting emulsion was filtered on a suction funnel and the filtrate was heated to 200° F. to remove methanol without gelling. 20 cc. of water was then added and boiled, then 15 cc. of aqueous butyl alcohol was added. The oil remained clear. It was dehydrated at 330° F. and filtered rapidly with Super-Cel. The clear oil had an alkali value of 76 and sulfated ash 14.66%, an increase in ash value of 6.66% over the sulfonate solution charged.

*Example 15*

A solution of calcium mahogony sulfonate in lubricating oil containing about 40% of sulfonate and having an ash content of about 8% was diluted with 100 cc. of naphtha—250 B.P. in 160 grams of the sulfonate oil. To this solution was added 20 grams of calcium oxide in suspension in 150 cc. methanol. The mixture was agitated vigorously while a stream of sulfur dioxide was introduced until 20 grams had been added. This required about 20 minutes and the temperature rose to about 135° F. Then 200 cc. more naphtha was added and agitation continued for about 40 minutes total time.

On standing overnight, the mixture separated into two layers, an oil layer on the bottom and a clear methanol layer on the top. The emulsion was filtered rapidly on a suction funnel without separating the layers. Methanol was evaporated off to a temperature of 180° F. whereupon the oil assumed the structure of gel which solidified on cooling.

To the gel was added butyl alcohol and benzene which formed a clear solution on heating. Lime was added to the solution to insure complete neutrality. The excess lime was filtered off and the clear filtrate was evaporated without further gelling, and re-filtered at a temperature at 340° F. giving a brilliantly clear red oil which became a sticky semisolid on cooling to room temperature. Analysis of the oil gave the following results: Sulfated ash— 17.45%. Titration with phenolphthalein indicator—2.5 acid. With methyl orange—78 basic with evolution of $SO_2$.

When a sample of this oil was heated with water it formed an emulsion which, on drying gave an opalescent oil which was examined under the microscope and found to contain particles of calcium sulfite with a uniform dimension of about 1 to 3 microns. The particles exhibited a feathery structure at a 400× magnification.

Referring to the drawing the emulsifier from 10 is passed through a flow controller 11 and thence by line 12 and pump 13 to contactor 14. The emulsifier is usually an oil solution of a soap or oil soluble organic acid having a sufficiently high molecular weight to give it surface active properties. Sulfonic acids, phosphonic acids and fatty acids (carboxylic acids) having upwards of 12 carbon atoms and usually 20 to 60 carbon atoms are most convenient to use in the process. When these acids or their salts exist as liquids at ordinary temperatures they may be conveniently charged directly to the process. In general, however, they are more conveniently employed in solution in oils, animal, vegetable, mineral or synthetic oils such as esters, and olefin polymers, the amount of emulsifier in the oil usually being about 10 to 60%.

Where desired an additional amount of the same or different oil can be introduced into the emulsifier by line 15. For many purposes a light lubricating oil of the character of a neutral oil having a viscosity of 60 to 500 SSU at 100° F. is satisfactory. It is usually desirable to also introduce by line 16 a hydrocarbon diluent, usually a petroleum naphtha or aromatic hydrocarbon solvent such as benzene, toluene, or xylene. A petroleum naphtha having a boiling point within the range of about 250°– 300° F. is usually preferred although lower boiling naphthas can be used if adequate provision is made for their recovery.

To the stream of emulsifier in line 12 there is added a dispersion or slurry of calcium oxide from 17 dispersed in 18 in anyhdrous methanol charged by line 19. The dispersion is controlled by flow controller 20 to maintain the correct ratio of CaO to emulsifier. Sufficient CaO is used to give the desired ash, alkali value and other characteristics in the product. Commercial methanol containing less than 1% water, preferably less than 0.5% water is suitable and it is desirable that the CaO be dispersed sufficiently so that the particles will pass a 100 mesh screen, fine dispersions being desirable for rapid reaction in the later stages of the process. Calcium oxide obtained from calcining calcium carbonate, limestone, marble, calcite or other form of calcium carbonate may be employed. However, I have found that oxide prepared by the dehydration of hydrated lime (calcium hydroxide), at temperatures of 1000° to 2000° F. is more reactive than that prepared from the carbonate. The mixture of emulsifier, oil, calcium oxide and methanol charged to the contactor 14 will usually have a composition containing about 5 to 20 parts of emulsifier, 2 to 40 parts of oil, 2 to 20 parts of methanol and 1 to 4 parts of calcium oxide by weight. From 5 to 50 parts of hydrocarbon diluent may also be present although this may be introduced at a later stage of the process for the purpose of controlling consistency of the reaction mixture.

Little or no reaction occurs between the ingredients of the reaction mixture until they enter the contactor 14 where they are contacted with an anhydrous acid, in this case anhydrous carbonic acid or carbon dioxide introduced by line 21. The reaction is exothermic and the temperature may increase from room temperature i.e. about 80 to 100° F. in line 12 to 130° to 150° F. in contactor 14. The rate of the reaction is favored by higher temperature and can be controlled by the rate of introduction of $CO_2$ and by the amount of cooling provided by cooling jacket 22 surrounding the contactor. Contactor 14 may be a conventional orifice mixer or a mechanical mixer such as the well known turbine mixers manufactured by the Stratford Engineering Co. or the Vogt Machine Company. If desired contacting may be effected by rapidly recycling the gases within a cone bottom agitator in which the gases are withdrawn from the top of the agitator tank by a suitable compressor and forced into the liquid at the bottom of the tank in a manner well known in the art. To increase the rate of absorption of $CO_2$ it is desirable to maintain a superatmospheric pressure on the contactor ranging from about 1 to 20 atm. although atmospheric pressure is satisfactory. From contactor 14, the reaction mixture passes to separator 23 where the unabsorbed gases such as $CO_2$, $H_2S$ and air, if present, are withdrawn by line 24 leading to a suitable absorber, not shown, for recovering methanol and other valuable solvent vapors.

The liquid phase from separator 23 is conducted by line 25 and pump 26 to a second stage contactor 27, likewise equipped with cooling jacket 28. Additional carbonation is effected therein by introduction of carbon dioxide by line 29. For this purpose carbon dioxide can be obtained from the calcination of calcium carbonate or from the extraction of flue gases with suitable absorbents such as the ethanol amines in the well known Girdler process. $CO_2$ for the purpose is also available on the market in the form of liquid $CO_2$ or solid $CO_2$ in the form of Dry Ice.

To facilitate operation of the process it is desirable to maintain a higher pressure in contactor 27 than in contactor 14 and temperatures of the order of 125° to 250° F., usually about 150° F., are satisfactory, sufficient cooling being provided to keep the temperature below the boiling point of methanol at the respective pressures existing in the contactor.

From contactor 27 the completely carbonated reaction mixture passes into the separator 29 where unreacted carbon dioxide and other gases are recycled by line 21 through cooler 30 back to the first stage contactor 14 for substantially complete absorption of their $CO_2$ content.

In the contactors 14 and 27 the emulsion of oil and methanol increases in consistency as the carbonation reaction proceeds and it is sometimes desirable to introduce additional amounts of hydrocarbon diluent which is conveniently done by valved lines 31 and 32. The liquid phase in the bottom of separator 29 will usually contain emulsified methanol and oil together with colloidally dispersed calcium salts and from 1 volume to 3 volumes of diluent. Depending on operating conditions, reactivity of the calcium oxide employed and other factors, there may also be an excess of calcium oxide which must be removed from the reaction product. This can usually be most easily effected by conducting the reaction mixture by lines 33 and 34 and pump 35 to filter 36 and separator 37 wherein a methanol phase rises to the top and is conducted by line 38 back to the disperser 18 or if desired to the contactor by line 39. The oil and diluent is then conducted by line 40 back to line 33 for further processing valve 41 being closed when operating in this manner.

In some cases I have found it possible to increase the rate of absorption of calcium compounds in the oil by injecting a small amount of water into contactors 27 or 14, lines 42 and 43 being provided for the purpose. The amount of water employed for this purpose can be about 5 to 20% of the weight of calcium oxide employed, generally about 10%. When injecting water, it is important that it be introduced uniformly in order to avoid any local high concentrations of water which would hydrate the calcium oxide and produce troublesome calcium hydroxide. This objective is best accomplished by adding the water in the form of a solution in methanol, suitably a solution containing about 5 to 20% of water. Under these conditions and with rapid agitation within contactors 27 and 14, difficulty from formation of calcium hydroxide can be substantially avoided.

The emulsion from 29 either directly or after filtering as just described, passes into stripper 44 where the methanol is stripped, the methanol vapor passing by line 45 to fractionator 46. In 46 the methanol is separated from hydrocarbons carried over with it, the methanol vapor passing by line 47 to condenser 48 and receiver 49. Reflux is returned by line 50 and pump 51 back to fractionator 46. The methanol collected in 49 is returned to the system by pump 49a and line 49b. Heat for fractionator 46 can be supplied by steam coil 52.

Heat for operating stripper 44 can be supplied by a steam jacket or submerged coil but I prefer to supply the heat required for methanol stripping by hot hydrocarbon vapors. For this purpose, hydrocarbons from 46 are conducted by line 53 and pump 54 to heater 55 where they are heated and largely vaporized before entering the bottom of stripper 44. Additional hydrocarbons for this purpose can be supplied by line 56.

The stripped oil from the base of 44 at a temperature of about 180°–210° F., passes by line 57 to still 58 where the remaining hydrocarbon diluent is distilled off, preferably with the aid of steam introduced by line 59.

In addition to the steam I have found it desirable to introduce excess water by line 60 to insure sufficient water for hydrating calcium compounds in the oil which otherwise may form a solid gel structure at this stage of the process when the hydrocarbon diluent is removed.

The hydrocarbon vapors from 58 pass by line 61 to condenser 62 and receiver 63 where the hydrocarbons separate as an upper layer and return by line 64 through drying chamber 65 and line 66 back to the beginning of the process. Silica gel, calcium oxide or other well known desiccating agents can be used in dryer 65. The addition of water to the oil in still 58 also releases some chemically combined methanol which is collected with the water condensed in 63. This is withdrawn by line 67 to a still, not shown, for recovery of methanol.

From still 58 the oil stream with dispersed calcium compounds is conducted by line 68 to dehydrating still 69 where water is removed by vapor line 70 leading to condenser 71. The condensate is conducted by line 72 to a separator, not shown, for recovery of hydrocarbons and alcohols which may be added to the oil as will be described. A temperature in the range of 300° to 400° F. is usually sufficient to remove all the water. The introduction by line 73 of a higher alcohol which is oil soluble, for example butyl alcohol, amyl alcohol, and cyclohexanol, is sometimes advantageous for breaking any emulsion of water and oil which may be formed, facilitating dehydration and insuring complete hydration of the dispersed calcium compounds. For this purpose I prefer secondary butyl alcohol saturated with water.

From dehydrator 69 the hot oil is withdrawn by line 74 and is forced by pump 75 to filter 76 to remove any contaminating solids, scale, etc. which may have accumulated after the filtration in 36. For this purpose a simple filter press is satisfactory, the clear oil being discharged by line 77. When filter 36 is bypassed there will also be suspended in the oil some calcium hydroxide or carbonate resulting from unreacted calcium oxide remaining in the oil after leaving contactor 27.

In some cases, particularly in cases of low volume operation, I can process the oil from separator 29 batchwise, in which case it is convenient to pass the oil directly from line 33 to two or more stills or cone bottom tanks in parallel, equipped with heating jackets or heating coils and manifolded to be used alternately, part or all of the finishing process up to the last filtration being carried out in a single vessel.

Although I have described my invention with respect to certain specific examples I do not intend it be unnecessarily limited thereby. Thus I contemplate carrying out the entire process if desired, in a single reaction vessel wherein the dispersion of calcium compounds is produced by the interaction of calcium oxide and an acid or acid anhydride in the substantial absence of water but in the presence of an emulsion of an oil, methanol and organic acid emulsifier. Although I prefer to make oil products which contain transparent dispersions of calcium compounds, preferably water insoluble calcium salts, my process also can be used for making opalescent oils in which the dispersed particles of calcium compounds are within the lower end of the visible range with respect to particle size.

My oil products containing calcium compounds will usually have a basic reaction to strong mineral acid. For example, they will usually titrate basic to standard hydrochloric acid. The method of determining acid number or base number referred to throughout this specification is as follows: to a 10 gram sample of oil in a 500 cc. Ehrlenmeyer flask there is added 100 cc. $CCl_4$, 50 cc. NaCl brine (15%) and 50 cc. methanol. The mixture is brought to boiling and titrated in the presence of phenolphthalein or methyl orange indicator using standard KOH solution or HCl solution having a normality of 0.178. The cubic centimeters of standard solution required to reach the end point correspond directly to the milligrams of KOH per gram of oil tested.

Many applications of the products of this invention will become apparent to those skilled in the art. Their principal use at present lies in the field of lubricating oils adapted for use in internal combustion engines, lubricating greases, anti-rust oils used as preservatives for machinery, corrosion resisting oils for use in marine engines, and machines exposed to sea water and many similar applications. It is also contemplated to use products prepared with vegetable and animal oils in food preparations and cosmetics. The amount required to be added to these oils depends on the usage. In lubricating oil, the addition to the oil of about 1 to 5% of additive concentrate having a base number of 50 to 200 is usually effective.

Having thus described my invention what I claim is:

1. The process of preparing dispersions of calcium compounds in oils comprising reacting calcium oxide with an acid reagent selected from the class consisting of acids and acid anyhdrides whose calcium salts are water insoluble, in the presence of an emulsion of oil, methanol and an oil soluble emulsifying agent in the absence of water, said reactants being present in the following ratios:

| | Parts (wt.) |
|---|---|
| Emulsifying agent | 5–20 |
| Oil | 2–40 |
| Methanol | 2–20 |
| Calcium oxide | 1–4 | acid reagent sufficient to convert the calcium oxide to the dispersed compound, distilling methanol from the reaction mixture thereafter treating the mixture with water to break the gel formed in said mixture and recovering oil and dispersed calcium compound from the water and insoluble residue.

2. The process of claim 1 wherein the oil is a mineral lubricating oil.

3. The process of claim 1 wherein the acid reagent is carbon dioxide.

4. The process of claim 1 wherein a hydrocarbon diluent is employed in said reaction mixture to reduce the consistency thereof and aid recovery of methanol.

5. The process of claim 1 wherein said emulsifying agent is selected from the class consisting of the carboxylic acids, the organic acids of phosphorus and sulfur and their salts, having upwards of 12 carbon atoms.

6. The process of claim 1 wherein the calcium oxide employed is the product of roasting calcium hydroxide at a temperature of 1000° F. to 1500° F.

7. The process of making a super based phosphorus containing lubricating oil additive which comprises the following steps:

(a) preparing an emulsion of 2–20 parts by weight of anhydrous methanol, 1–4 parts of calcium oxide, 2–40 parts of lubricating oil and 5–20 parts of dispersant derived from the reaction between phosphorus sulfide and an olefin polymer, (b) injecting a stream of carbon dioxide into said emulsion in the absence of water, thereby forming a reaction mixture comprising gelatinous colloidal dispersion of calcium carbonate, (c) distilling methanol from the resulting mixture, (d) thereafter treating the said mitxure with water to break the gel formed therein, and (e) dehydrating the resulting product oil.

8. The process of claim 7 wherein the treatment with water in step (d) is accelerated by the addition to the water of a small amount of an oil soluble alcohol of four to six carbon atoms.

9. The process of claim 7 wherein unreacted calcium oxide is removed from the emulsion of methanol and oil by filtration before separating the methanol.

10. The process of claim 7 wherein the calcium oxide employed in the process is derived from the ignition of calcium hydroxide.

11. The process of making a superbased lubricating oil additive which comprises mixing an oil solution of 10 to 60 percent calcium mahogany sulfonate with methanol and calcium oxide, emulsifying the mixture by rapid agitation and, in the absence of water, introducing an acid reagent selected from the class consisting of acids and acid anhydrides whose calcium salts are water insoluble, continuing the reaction until the calcium oxide is substantially all neutralized in the emulsion, separating methanol from the reaction mixture by distillation, thereafter treating the mixture with water to break the gel formed in said mixture, and recovering lubricating oil containing a colloidal dispersion of the calcium salt of said acid reagent.

12. The process of making a superbased lubricating oil which comprises preparing a mixture of 5 to 20 parts by weight of calcium mahogany sulfonate, 2 to 40 parts by weight of oil, 2 to 20 parts by weight of methanol and 1 to 4 parts by weight of calcium oxide, introducing into the said mixture a stream of carbon dioxide while the mixture is rapidly agitated in the absence of water, thereby forming a colloidal dispersion of calcium carbonate, separating methanol from the reaction mixture by distillation, thereby forming a gelatinous dispersion, thereafter treating the gelatinous dispersion with water to break the gel, and recovering oil containing dispersed calcium carbonate.

13. The process of claim 12 wherein calcium oxide employed in the reaction is derived from the ignition of calcium hydroxide.

References Cited by the Examiner

UNITED STATES PATENTS

| 2,861,951 | 11/58 | Carlyle | 252—18 XR |
| 2,865,956 | 12/58 | Ellis et al. | 252—33 XR |
| 2,956,018 | 10/60 | Carlyle et al. | 252—39 XR |
| 3,021,280 | 2/62 | Carlyle | 252—33 |

FOREIGN PATENTS

| 210,336 | 9/57 | Australia. |
| 570,814 | 2/59 | Canada. |
| 574,161 | 4/59 | Canada. |

DANIEL E. WYMAN, *Primary Examiner.*

JULIUS GREENWALD, ALPHONSO D. SULLIVAN,
*Examiners.*

UNITED STATES PATENT OFFICE
CERTIFICATE OF CORRECTION

Patent No. 3,170,880                       February 23, 1965

Vanderveer Voorhees

It is hereby certified that error appears in the above numbered patent requiring correction and that the said Letters Patent should read as corrected below.

Column 3, line 11, for "direcly" read -- directly --; column 4, line 54, for "sulfate" read -- sulfonate --; column 6, line 48, for "sulfonate" read -- sulfate --; column 14, line 2, for "mitxure" read -- mixture --.

Signed and sealed this 24th day of August 1965.

SEAL)

test:

RNEST W. SWIDER                           EDWARD J. BRENNER
sting Officer                                  Commissioner of Patents